US005398113A

United States Patent [19]
de Groot

[11] Patent Number: 5,398,113
[45] Date of Patent: Mar. 14, 1995

[54] METHOD AND APPARATUS FOR SURFACE TOPOGRAPHY MEASUREMENT BY SPATIAL-FREQUENCY ANALYSIS OF INTERFEROGRAMS

[75] Inventor: Peter de Groot, Middletown, Conn.

[73] Assignee: Zygo Corporation, Middlefield, Conn.

[21] Appl. No.: 14,707

[22] Filed: Feb. 8, 1993

[51] Int. Cl.[6] .......................... G01B 9/02; G01B 11/24
[52] U.S. Cl. ...................................... 356/360; 356/376
[58] Field of Search ............... 356/359, 349, 360, 376, 356/384, 345, 357

[56] References Cited

U.S. PATENT DOCUMENTS

| | | | |
|---|---|---|---|
| 4,340,306 | 7/1982 | Balasubramanian | 356/360 |
| 4,523,846 | 6/1985 | Breckinridge et al. | 356/346 |
| 4,818,110 | 4/1989 | Davidson | 356/358 |
| 5,112,129 | 5/1992 | Davidson et al. | 356/359 |
| 5,133,601 | 7/1992 | Cohen et al. | 356/359 |
| 5,153,669 | 10/1992 | DeGroot | 356/360 |
| 5,194,918 | 3/1993 | Kino et al. | 356/359 |

OTHER PUBLICATIONS

Danielson, B. L. and Boisrobert, C. Y. "Absolute Optical Ranging Using Low Coherence Interferometry", *Applied Optics*, 20 Jul. 1991, vol. 30, No. 21.

Flournoy, P. A., McClure, R. W. and Wyntjes, G. "White-Light Interferometric Thickness Gauge", *Applied Optics*, Sep. 1972, vol. 11, No. 9.

Kohlhaas, A. Frömchen, C. and Brinkmeyer, E., "High-Resolution OCDR for Testing Integrated-Optical Waveguides: Dispersion-Corrupted Experimental Data Corrected by a Numerical Algorithm", *Journal of Lightwave Technology*, Nov. 1991, vol. 9, No. 11.

Youngquist, R. C. Carr, S. and Davies, D. E. N., "Optical Coherence-Domain Reflectometry: a New Optical Evaluation Technique", *Optical Letters*, Mar. 1987, vol. 12, No. 3.

Lee, B. S. and Strand, T. C. "Profilometry With a Coherence Scanning Microscope", *Applied Optics*, 10 Sep. 1990, vol. 29, No. 26.

Dresel, T., Häuser, G. and Venzke, H., "Three-Dimensional Sensing of Rough Surface by Coherence Radar", *Applied Optics*, 1 Mar. 1992, vol. 31, No. 7.

Chim, S. S. C. and Kino, G. S., "Three-Dimensional Image Realization in Interference Microscopy", *Applied Optics*, 10 May 1992, vol. 31, No. 14.

*Primary Examiner*—Robert P. Limanek
*Assistant Examiner*—David B. Hardy
*Attorney, Agent, or Firm*—Cohen, Pontani, Lieberman, Pavane

[57] ABSTRACT

An optical system for measuring the topography of an object includes an interferometer with a multiple-color or white-light source, a mechanical scanning apparatus for varying the optical path difference between the object and a reference surface, a two-dimensional detector array, and digital signal processing apparatus for determining surface height from interference data. Interferograms for each of the detector image points in the field of view are generated simultaneously by scanning the object in a direction approximately perpendicular to the illuminated object surface while recording detector data in digital memory. These recorded interferograms for each image point are then transformed into the spatial frequency domain by Fourier analysis, and the surface height for each corresponding object surface point is obtained by examination of the complex phase as a function of spatial frequency. A complete three-dimensional image of the object surface is then constructed from the height data and corresponding image plane coordinates.

33 Claims, 5 Drawing Sheets

METHOD AND APPARATUS FOR SURFACE TOPOGRAPHY MEASUREMENT BY SPATIAL-FREQUENCY ANALYSIS OF INTERFEROGRAMS

FIELD OF THE INVENTION

The invention relates generally to precision optical metrology instrumentation and methods for imaging and analysis of surfaces and, more particularly, to interferometric methods and apparatus for three-dimensional topographical surface profiling of object surfaces.

BACKGROUND OF THE INVENTION

Among the widely-used instruments for measuring surface topographies are interferometers, which utilize the wave nature of light to map variations in surface height with high accuracy. However, it is well understood that if the source light for the interferometer is essential monochromatic—that is, characterized by a single-color emission having no perceptible spectral width in normal use of the instrument—it is not generally possible to accurately measure surface features with discontinuous height variations or surface roughness that exceed one-quarter of the wavelength of the source light. Such surface features result in interferometric phase ambiguities that are difficult or impossible to interpret. For this reason, a variety of instruments that are based on spectrally broadband or multiple-color sources have been proposed in an effort to overcome this limitation. The present invention relates to this form of instrument and to methods incorporating such instruments.

It is well known that white-light and multiple-color interferometers can overcome the problems associated with phase ambiguities, and these instruments are very useful for high-precision length measurement and surface profiling. For example, the colors seen in white-light interference patterns, first described by Hooke in 1665, are a sensitive measure of thickness between reflecting surfaces. In 1893, A. A. Michelson used white light to estimate the size of a series of step-shaped etalons as part of the procedure leading to the first comparison of the wavelength of light with the International Prototype Meter (12 Astronomy and Astro-Physics, pp. 558-60). Many of the traditional optical instruments for calibrating gauge blocks, which employ white light or multiple-color sources, as well as special microscopes suitable for white-light interferometry, have been available commercially for a number of years. White-light interference microscopes have been widely used for measuring film thicknesses and for monitoring surfaces with discontinuities several wavelengths deep.

The underlying principles of single- and multiple-color interferometry, as well as the use of white-light fringes to determine an optical path difference (OPD), are extensively treated in elementary optics texts. For example, the book *Physical Optics* by Robert W. Wood, first published in 1905 and recently reprinted by the Optical Society of America (Washington, D.C., 1988), provides numerous and detailed descriptions of phenomena related to white-light fringes, the interference colors in thin films, testing of optical components, measurement of phase-change on reflection using Newton's rings, dissonance and consonance of interference fringes formed in two-color sodium light, and the determination of lengths, gaps and film thicknesses by interferometry.

Although the basic principles of white-light and multiple-color interferometry are fundamental concepts of optics, the practical implementation of these principles in automated instruments is a fairly recent development. A detailed description of an automated white-light thickness gauge for plane-parallel films appears in an article by P. A. Floumoy, R. W. McClure and G. Wyntjes entitled *White Light Interferometric Thickness Gauge*, 11 Appl. Opt. 1907-15 (1972). The disclosed instrument is capable of measuring thicknesses from 2.5 to 500 $\mu$m with a resolution of 0.05 $\mu$m using mechanically-scanned interferometer mirrors and electronic intensity detection. Another implementation of a white-light interferometer is described by R. C. Youngquist, S. Carr and D. E. N. Davies in *Optical Coherence-Domain Reflectometry: A New Optical Evaluation Technique*, 12 Opt. Let. 158-60 (1987). That system is designed to determine positions and magnitudes of reflection sites within miniature optical assembles by searching for positions of high fringe contrast.

White-light (i.e. low coherence) interferometry for the analysis of optical waveguides has also been developed. Some of the known methods involve analyzing one-dimensional interferograms for their spatial frequency content using Fourier transform techniques. For example, in an article by A. Kohlhass, C. Froemchen and E. Brinkmeyer, *High-Resolution OCDR For Testing Integrated-Optical Waveguides: Dispersion-Corrupted Experimental Data Corrected By A Numerical Algorithm*, 9 J. Lightwave Tech. 1493-1502 (1991), there is presented a Fourier-transform technique for correcting dispersion-corrupted interferograms from integrated-optical waveguides. Similarly, an article by B. L. Danielson and C. Y. Boisrobert, *Absolute Optical Ranging Using Low Coherence Interferometry*, 30 Appl. Opt. 2975-79 (1991) describes a fiber-optic instrument evaluated as part of a program to develop diagnostic probes for testing the guiding characteristics of semiconductor laser sources. The article emphasizes the advantages of processing the data in the spatial frequency domain for absolute optical ranging through dispersive transparent media.

Despite the advances that have been made in the application of white-light interferometry to one-dimensional distance measurement, relatively few methods for obtaining three-dimensional representations of surface topography are known in the art. All such known methods are based on analysis of fringe contrast. Briefly described, the physical principles underlying the conventional fringe contrast method for topographical measurement are as follows. A typical white-light interferogram can be approximated by a constant bias $I_{DC}$ and a series of sinusoidal interference fringes modulated by an envelope function V:

$$I = I_{DC} + V \cdot \sin(\phi). \qquad \text{(Equation 1)}$$

The envelope function V is the fringe contrast, which varies much more slowly with changes in the OPD than the fringe phase $\phi$. The term fringe contrast has many synonyms such, for example, as fringe visibility, modulation, signal variance, modulus of the complex degree of coherence, and so on, depending upon the context of its use. It is a basic principle of optics that the peak contrast for white-light fringes in an ideal, dispersion-compensated interferometer occurs when the OPD is zero. Accordingly, a known technique for measuring surface topography is the determination of the position of maximum contrast simultaneously for a plurality of points on the surface being profiled, using an interferometer equipped with mechanical means for varying the OPD.

The first practical method and apparatus for automated, three-dimensional measurement of surface topography using white-light interferometry was disclosed in U.S. Pat. No. 4,340,306 to Balasubramanian, which issued Jul. 20, 1982. That patent describes a white-light interferometer which includes a mechanically-scanned reference mirror, a two-dimensional detector array, and computer control. The object and reference wavefronts are imaged together onto the detector array so that each detector element (pixel) corresponds to a point or location on the object surface. The method involves varying the OPD by scanning either the reference mirror or the object in discrete steps, measuring the fringe contrast for each pixel at each scan position, and in this manner determining for each surface point the position of maximum fringe contrast. The scan position for which the contrast is a maximum is a measure of the relative height of a particular surface point. An important feature introduced by Balasubramanian relates to the efficient use of computer memory. Although a great number of data points are processed in order to achieve a full three-dimensional image, the data acquisition method processes the data in a dynamic fashion so that very few computer registers are required for each pixel. At each point in the scan, the current fringe contrast for each pixel is compared to a stored value and, if it is larger, it replaces the stored value for that pixel, together with the current scan position. If the current fringe contrast is less than the stored value, on the other hand, it is discarded. This procedure dramatically reduces the memory requirements of the computer.

White-light interferometric microscopes are particularly useful for sectioning images according to surface height, in a manner analogous to confocal microscopes but without the complexity and high cost of confocal instruments. The application of automated mechanical scanning and detection of peak fringe contrast to the profiling of microscopic objects such as integrated circuits and the like is disclosed in U.S. Pat. No. 4,818,110 to Davidson. The apparatus is based on a common Linnik interference microscope, with the addition of electronic means for the processing of video images to obtain fringe contrast information and a piezoelectric transducer (PZT)-actuated object stage controlled by a computer. Similarly, in an article by B. S. Lee and T. C. Strand, *Profilometry With A Coherence Scanning Microscope*, 29 Appl. Opt. 3784-88 (1990), it is shown that white-light interferometry can improve lateral resolution over conventional microscopes, in addition to providing information about surface topography.

There have been many improvements related to rapid determination of fringe contrast in white-light interferometers and to the reduction of data to representations of three-dimensional images. An article by T. Dresel, G. Haeusler and H. Venzke entitled *Three-Dimensional Sensing Of Rough Surfaces By Coherence Radar*, 31 Applied Optics 919-25 (1992), describes an interferometer for rough surfaces metrology and comprised of a broadband source, a two-dimensional detector array, a reference mirror actuated by a PZT, and a mechanical translation stage for scanning the object. For each scan position, three intensity images are taken of the interferometer's output, corresponding to three different phases of the reference wave separated by $2\pi/3$ radians. The three phase shifts are obtained by small displacements of the reference mirror. The three intensity values per scan position are used in a simple formula to calculate the fringe contrast for each image pixel. At each position in the scan, the current fringe contrast for each pixel is compared to a stored valued and, if the current contrast value is larger, it replaces the stored value for that pixel, together with the current scan position. Several figures in the article depict graphical images of three-dimensional objects, including those considered rough according to the standards of conventional interferometry.

Another technique for rapidly measuring fringe contrast is by digitally filtering the interference data. In an article by Stanley S. C. Chim and G. S. Kino, *Three-Dimensional Image Realization In Interference Microscopy*, 31 Appl. Opt. 2550-53 (1992), there is described a digital filter algorithm for rapidly extracting the fringe contrast envelope. The interferograms are obtained by scanning an object through discrete positions separated by approximately 50 nm. After subtracting an estimate of $I_{DC}$ from the data, the results are passed through a known form of digital filter to recover the envelope which is then analyzed to determine the position of peak fringe contrast.

U.S. Pat. No. 5,133,601 to Cohen et al describes a white-light interference microscope equipped with a video camera and a PZT attached to effect mechanical scanning of the OPD. At each point in the scan, the current fringe contrast for each pixel is compared to a stored value and, if the current value is larger, it replaces the stored value for that pixel, together with the current scan position. Three methods for measuring the fringe contrast are there presented. The first calculates the fringe contrast at each scan position using five equally-spaced points on an interference fringe. The second uses three points to calculate fringe-contrast and combines the result with the mean interferometric phase for improving resolution. In the third method, a succession of image frames of intensity data are taken during a mechanical scan, the distance between frames being 50 nm. After subtracting an estimate of $I_{DC}$ from the data, the results are passed through a known form of digital filter to recover the envelope.

It is noteworthy that in all of the above-mentioned references, and in numerous other articles and patents related to measuring surface topography with white-light interferometry, surface height is determined by a systematic search to locate the maximum fringe contrast for each image pixel during a mechanical scan. Thus, all prior art methods for measuring surface topography with white-light interferometry are based on some variation of Equation 1. The data processing invariably consists of determining the position of maximum fringe contrast for a plurality of points on the object surface as imaged onto a detector array.

Using the position of maximum fringe contrast to topographically map surface features has many fundamental disadvantages. The contrast method requires a great number of calculations, but most of the results are discarded, and very few or only one data point per pixel is preserved for the final measurement. Thus the method does not make effective use of all of the available interference data. In addition, the method is unusually sensitive to random noise, such as spikes or missing data points, that would be interpreted as positions of high fringe contrast.

A further disadvantage of most fringe-contrast calculation techniques is that they are highly wavelength dependent and may fail if the mean wavelength or other spectral properties of the source vary due to changes in environmental conditions or adjustments to illumination strength. Generally, the fringe contrast envelope must be assumed to be of a particular functional form, such as Gaussian, in order to be accurate; distortions of the envelope shape due to surface colors or unexpected or unusual source spectra can also lead to significant errors.

Still another disadvantage of fringe-contrast methods characteristic of the prior art is that the object or reference wavefront must be displaced according to particular fixed distance intervals, and no procedure is provided for adjusting the density of data points per interference fringe to optimize the signal-to-noise ratio and data acquisition speed in accordance with surface characteristics and desired precision. In particular, all automated white light interferometers presently known in the art require a minimum of two data points per interference fringe (i.e. the Nyquist rate), and often require five or more points spaced at precise intervals. This minimum sampling rate severely limits the speed at which topographical images can be acquired and processed.

Finally, it is noted that a serious and fundamental limitation of the fringe-contrast method is that the correspondence between maximum fringe contrast and zero OPD holds true only for ideal interferometers that have been perfectly compensated for chromatic dispersion. Thus, if the interferometer is imperfect, or the object is composed of a transparent, dispersive medium, then the fringe contrast envelope is shifted with respect to the zero OPD position and may be severely distorted. Under these conditions, it is not possible to obtain accurate three-dimensional images using any known prior art white-light method or apparatus.

OBJECTS OF THE INVENTION

Accordingly, it is a principal object of the present invention to provide a method and apparatus for three-dimensional measurement of topographical surface profiles.

It is a particular object of the invention to provide an interferometric method and apparatus for measuring surfaces whose roughness or discontinuous features require the use of multiple-color or white-light sources.

It is a further object of the invention to provide such a method and apparatus that efficiently utilizes all available interference data.

It is another object of the invention to provide such a method and apparatus that exhibits substantial insensitivity to random noise such as spikes or gaps in the data, to distortions in the data caused by variations in DC bias, and to variations in illumination source characteristics such as mean wavelength.

A still further object of the invention is to provide such a method and apparatus that exhibits substantial insensitivity to adjustments in the optical path difference scan interval between successive data frames.

Yet another object of the invention is to provide such a method and apparatus that has the ability to utilize multiple-color and other illumination sources with unusual spectral distributions, to process data with less than two points per interference fringe, and to measure the thickness of dispersive transparent media.

SUMMARY OF THE INVENTION

In accordance with a preferred method of the invention, and apparatus for accomplishing the same, a first step consists of illuminating a Twyman-Green or equivalent amplitude-division interferometer with a spectrally-broadband source. The interferometer includes appropriate optics for imaging together an object surface and a reference surface onto a solid-state imaging array, resulting in an interference intensity pattern that can be read electronically into a digital computer. In a second step, interferograms for each of the image points in the field of view are simultaneously generated by scanning the object in a direction approximately perpendicular to the surface illuminated by the interferometer while recording detector data in digital memory. The data acquired in this manner consists of an array of interferograms, one for each pixel, each representing the variation in intensity as a function of scan position.

In a next step, the interferograms stored in the computer are individually transformed into the spatial frequency domain by digital Fourier analysis. The transformed data represents, for each pixel, the relative intensity and interferometric phase as a function of spatial frequency. In a further step, the spatial frequency data is examined to determine the mean wavelength and spectral distribution of the light that generated the interference pattern. In a next step, the interferometric phase as a function of wavenumber in the interferogram is approximated by a least-squares polynomial fit to the transformed data. In a succeeding step, heights for the surface points corresponding to the image pixels are calculated from the coefficients of the polynomial. The final step is the creation of a complete three-dimensional image constructed from the height data and corresponding image plane coordinates.

The inventive method for measuring surface topography differs markedly and fundamentally from the prior art in that the fringe contrast is never calculated, and neither is the fringe contrast used to measure the surface topography. The analysis takes place entirely in the spatial frequency domain, where the specific objectives of the invention are more readily achieved.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

THEORY OF THE INVENTION

The following mathematical discussion is presented for the purposes of facilitating a complete understanding of the present invention and clarifying the physical principles underlying the invention. For simplicity, spatial coherence effects such as focus and spatial decorrelation have been neglected.

When a single-color (monochromatic) source illuminates a two-beam interferometer equipped with a square-law intensity detector, a pattern that appears as a sequence of sinusoidal fringes of spatial frequency k and phase $\phi$ is generated in space. By the term spatial frequency is meant the rate of change of phase, in radians, as a function of mechanical displacement of one of the mirrors in the interferometer with respect to the other. This quantity k is also known as the angular wavenumber, or simply the wavenumber, of the source light. The relationship between the wavenumber k, the phase $\phi$, and an OPD Z in the interferometer is given by the relation $$\phi = k \cdot Z \qquad \text{(Equation 2)}$$

The distance Z, sometimes referred to as the phase-velocity OPD, is also a function of wavenumber, unless the interferometer is perfectly compensated for dispersion.

An arbitrary interferogram may be considered to be the sum of a number of independent fringe patterns of various colors that are added together, in a manner referred to as incoherent superposition. By suitable mathematical manipulation of the interferogram, it is possible to recover these virtual single-color fringe patterns for the purpose of determining their relative strengths and phases. This mathematical procedure is referred to as Fourier analysis, and data thus converted according to its various wavenumber components is said to have been Fourier transformed into the spatial frequency domain. These principles were known to A. A. Michelson in the 19th century, and they form the basis of the modern science of Fourier transform spectroscopy.

Once an interferogram has been transformed in terms of wavenumbers k and corresponding phases $\phi$, it is possible to precisely measure distances by observing how the phases vary as a function of wavenumber. To do this, we first consider the general case of a phase that can be expanded in a Taylor series expansion about a mean wavenumber $k_0$:

$$\phi = \phi_0 + (k - k_0) \cdot \frac{d\phi}{dk}\bigg|_{k_0} + \frac{(k - k_0)^2}{2} \cdot \frac{d^2\phi}{dk^2}\bigg|_{k_0} + \cdots \qquad \text{(Equation 3)}$$

The first, constant term $\phi_0$ is the phase for $k = k_0$ and is given by $$\phi_0 = k_0 \cdot Z_0. \qquad \text{(Equation 4)}$$

The second term, which is the first-order variation of phase with wavenumber, can be written as $$\frac{d\phi}{dk}\bigg|_{k_0} = Z_0 + k \cdot \frac{dZ}{dk}\bigg|_{k_0} = G_0 \qquad \text{(Equation 5)}$$

The distance $G_0$ is known as the group-velocity OPD, and is equal to the so-called phase-velocity OPD $Z_0$ only for the special case of an interferometer that has been perfectly compensated for dispersion. The phase as a function of wavenumber can now be written as $$\phi = k_0 \cdot Z_0 + (k - k_0) \cdot G_0 + \frac{(k - k_0)^2}{2} \cdot \frac{dG}{dk}\bigg|_{k_0} + \cdots \qquad \text{(Equation 6)}$$

Equation 6 demonstrates that if the phase as a function of wavenumber is known in the neighborhood of the mean wavenumber $k_0$, it is then possible to recover the phase-velocity OPD $Z_0$, the group-velocity OPD $G_0$, the rate of change of G with wavenumber and other terms of higher order, depending on the quality of the data.

Equivalent forms of Equation 6 are well known in Fourier transform spectroscopy, where they are used in the extraction of emission and absorption spectra from interferograms. Similar equations have also been used to determine optical lengths and dispersion parameters in the study of solid-state waveguides and optical fibers. However, the principles of frequency-domain analysis have never been applied to the realization of three-dimensional representations of surface topography.

The present invention thus exploits frequency-domain analysis in a unique, advantageous and heretofore unrecognized manner so as to precisely measure the three-dimensional surface topography of an object. In doing so, the invention differs substantially from the prior art of surface topography measurement in that the calculations of surface height are performed entirely in the spatial-frequency domain, in a manner previously known only in the context of Fourier transform spectroscopy and one-dimensional measurements of waveguides and optical fibers and the like. This innovative three-dimensional imaging method, together with enabling apparatus, provides significant advantages and functionality unrealized by the fringe contrast methods characteristic of the prior art.

DETAILED DESCRIPTION OF THE PREFERRED EMBODIMENTS

Figure 1:
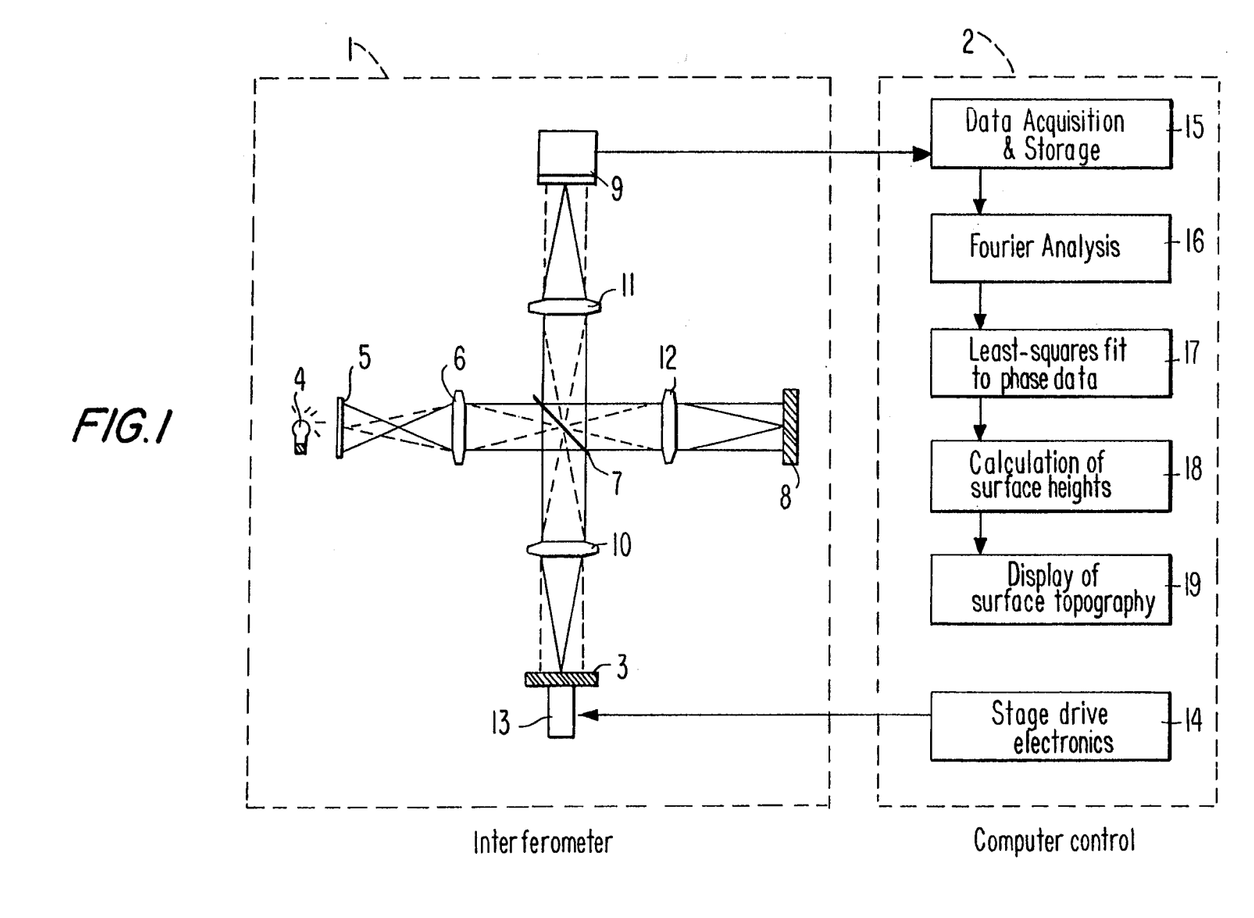
FIG. 1 is a diagrammastic depiction of the principle components of an apparatus constructed in accordance with the teachings of the present invention.

Referring first to FIG. 1, there is shown a measurement system in accordance with the invention and based on an amplitude-division interferometer 1 and automated computer control device 2. The measurement system is operable to obtain a three-dimensional topographical image of an object surface 3 which, in the figure, is represented as one of the two mirrors of the interferometer.

A source 4, which may be a spectrally-broadband, multiple-color or white-light lamp, illuminates a diffusing screen 5. It should be noted that embodiments which utilize or employ a narrow band or quasi-monochromatic source with a high numerical aperture are also within the intended scope and contemplation of the invention. A condenser lens 6 collects the light and projects it into the interferometer optics. Interferometer 1 is comprised of a beam-splitting element 7 that transmits one portion of the beam to a reference mirror 8 and the other beam portion to the target 3. The two beams respectively reflected from the object surface 3 and reference surface 8 are recombined and projected onto a two-dimensional detector array 9 which generates signals proportional to the resultant beam intensity produced by the interference effect.

An objective lens 10 and a camera lens 11 focus the image of the object surface 3 onto the array 9 so that each element of array 9 corresponds to a respective point or small region or location of the surface 3. Additionally, a lens 12 is used in conjunction with camera lens 11 to image the reference surface onto the same detector array 9. When all lenses are properly arranged, an interference pattern is observed at the detector 9, even for extended (i.e. spatially incoherent) illumination.

Figure 2:
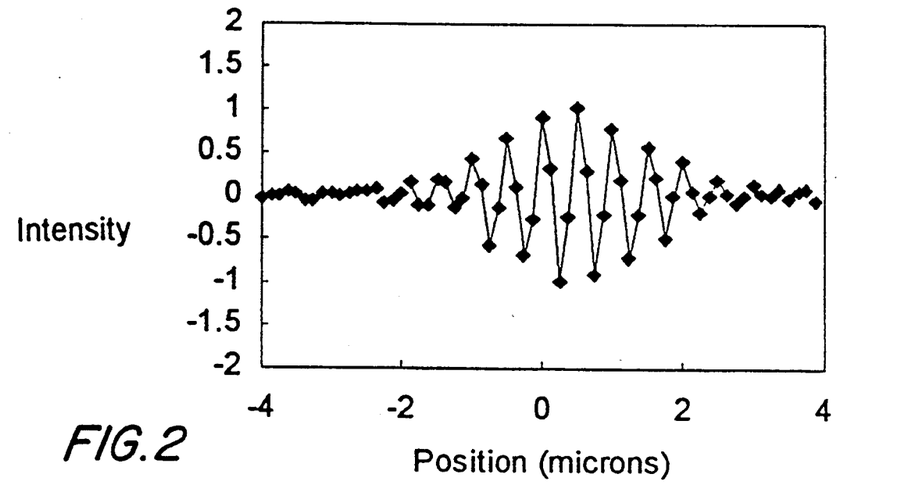
FIG. 2 is a graph depicting a typical interferogram for one pixel in the detector array.

The object surface 3 is displaced or actuated by an electro-mechanical transducer 13, such as a piezoelectric transducer (PZT), and associated drive electronics 14 controlled by computer 2 so as to effect precise mechanical scans along a direction that varies the optical path difference (OPD) of the interferometer. In a preferred method of the invention, several frames of intensity data are acquired by the detector array 9 and associated electronic data acquisition and storage means 15 during a continuous scan of the object 3. The data thus acquired is stored in digital format as an array of interferograms, one for each pixel, each interferogram representing the variation in intensity as a function of scan position. For example, if the detector 9 consists of an array of 128×128 charge-coupled devices, and if 64 images are stored during the scan, then there will be approximately 16,000 interferograms each 64 data points in length. A computer-simulated white-light interferogram, sampled at the rate of one frame every 125 nm (the round-trip OPD) and corrupted by random intensity noise, is shown in FIG. 2.

After the data has been acquired, the computer 2 analyzes each of the stored interferograms to determine its composition in terms of wavenumbers and corresponding phases. This step in the signal processing procedure appears as the block 16 in FIG. 1. Starting with a single-column array of N intensity values $I_i$ taken at equally-spaced OPD positions $Z_i$, the contribution to a given interferogram for a particular wavenumber $k_j$ is calculated using the following mathematical relationship:

$$P_j = \sum_i I_i \cdot e^{ik_j z_i} \quad \text{(Equation 7)}$$

The result $P_j$ is the $j^{th}$ component of the Fourier transform. The data processing technique therefore includes the step of either applying Equation 7 directly for the selected values of $k_j$, or obtaining a set of N/2 positive-wavenumber components by using specialized algorithms such, for example, as the well-known Fast Fourier Transform (FFT).

The results $P_j$ of the Fourier analysis consist of a list of complex numbers that can be expressed in the form $$P_j = |P_j| \cdot e^{i\phi_j} \quad \text{(Equation 8)}$$

Figure 3:
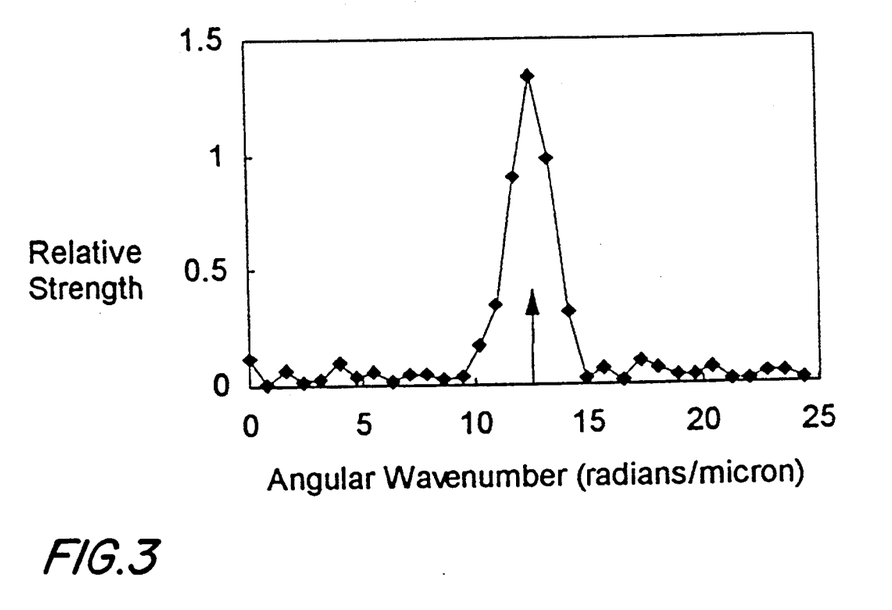
FIG. 3 is a graph depicting the relative strength of the various spatial frequency components of the interferogram shown in FIG. 2.
Figure 4:
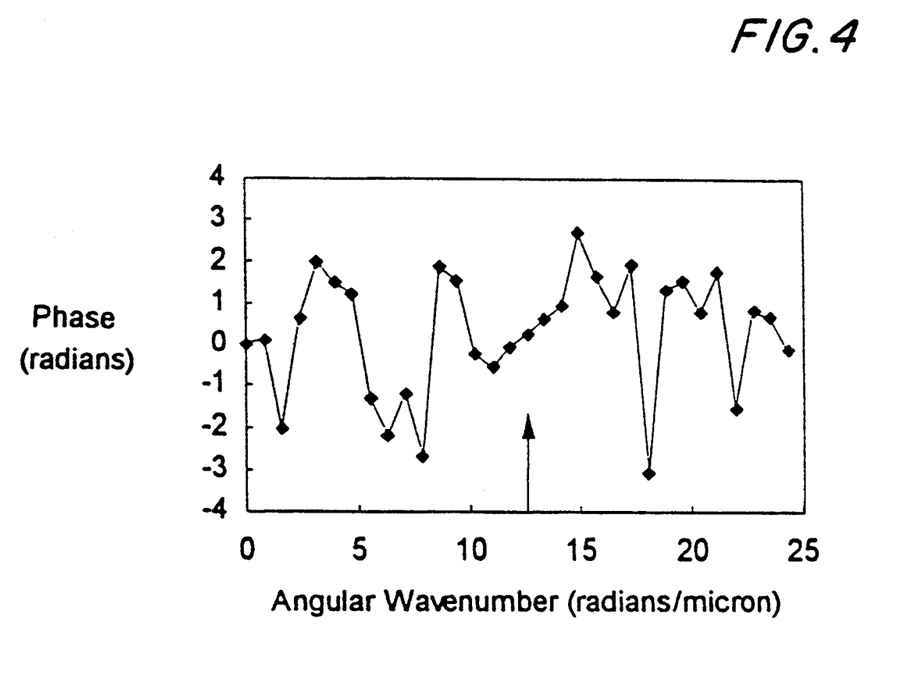
FIG. 4 is a graph depicting the interferometric phases corresponding to the various spatial frequencies shown in FIG. 3.

The transformed interferograms now represent, for each pixel, the relative intensity or strength $|P_j|$ and the interferometric phase $\phi_j$ as a function of wavenumber $k_j$. Shown in FIG. 3 is a graph depicting the relative intensity $|P_j|$ as a function of the wavenumber $k_j$, resulting from the Fourier transform of the interferogram shown in FIG. 2. The phase $\phi_j$ as a function of the wavenumber $k_j$ for this same example is graphically depicted in FIG. 4.

Most of the useful information in the Fourier-transformed data is contained in the region in which the relative intensities $|P_j|$ are large. Therefore, in accordance with a preferred method of the invention, a simple peak-finding search is performed to locate this region. Alternatively, if the scan rate and the spectral characteristics of the source are precisely known, the location of this region can be predicted. For example, a source having a mean emission wavelength of 500 nm will have a peak at wavenumber $k_0 = 2\pi/500$ nm. Now, if the interferogram has 64 data points acquired at round-trip OPD intervals of exactly 125 nm, then wavenumber $k_0$ is equivalent to 16 cycles per 64-point scan. The predicted peak for the example of FIG. 3 is indicated in that figure by an arrow.

Once the region of interest in the Fourier-transformed data is identified—either by prediction or by automated search—a series of data pairs ($\phi_j$, $k_j$) is collected from this region for use in calculating the coefficient terms or parameters of Equation 6. This step in the signal processing technique is represented by the block 17 in FIG. 1. The modulo $2\pi$ ambiguities in the phase data are removed by recursive application of the formula $$\phi_j = \phi_j - 2\pi \cdot \text{Int}\left\{ \frac{\phi_j - \phi_{j\pm 1}}{2\pi} \right\} \quad \text{(Equation 9)}$$

The $\pm$ relates to whether the recursion is in the direction of increasing or decreasing values of j. The function Int{} returns the nearest integer to its argument, and is used to force continuity between adjacent phase values.

Next, a polynomial is fit to the ($\phi_j$, $k_j$) data pairs in order to estimate the coefficient terms in Equation 6. This step in the signal processing technique is also represented by the block 17 in FIG. 1. A linear least-squares fit polynomial is generally sufficient, unless a large amount of second-order dispersion is present in the interferogram in which case a quadratic fit may be appropriate. For the purpose of measuring surface topography, the slope and constant terms are of primary interest. In particular, the group-velocity OPD $G_0$ can be readily calculated from the phase slope and an inverted form of Equation 5:

$$G_0 = \frac{d\phi}{dk}\bigg|_{k_0} \quad \text{(Equation 10)}$$

The relationship between the group-velocity OPD $G_0$ and the actual physical topography of a surface is governed by the group-velocity index $n_G$. Referring once more to FIG. 1, a relative change $\Delta G$ in round-trip group-velocity OPD corresponds to a change $\Delta h$ in physical surface height according to the relationship $$\Delta h = \frac{\Delta G}{2n_G} \qquad \text{(Equation 11)}$$

This calculation is performed for each pixel in the image, resulting in a three-dimensional map $\Delta h(x,y)$ of the object surface topography, where x,y are the surface coordinates. This further step in the inventive signal processing technique appears as the block 18 in FIG. 1.

An optional next step in processing of the data consists of improving the resolution of the measurement for each pixel through use of the constant term $k_0 \cdot z_0$ which appears in Equation 6. This constant term is obtained automatically as a consequence of the least-squares fit effected in the previous step, but its value is only known modulo $2\pi$. This difficulty is avoided by way of the following calculation, which utilizes the approximate $\Delta h$ value calculated from the phase slope:

$$\Delta h' = \qquad \text{(Equation 12)}$$
$$\frac{1}{2n}\left[\frac{(\phi_0 - \alpha)}{k_0} - \frac{2\pi}{k_0} Int\left(\frac{(\phi_0 - \alpha) - (2k_0 \cdot h \cdot n)}{2\pi}\right)\right]$$

The quantity n is the index of refraction, sometimes referred to as a phase-velocity index of refraction to distinguish it from $n_G$. The constant phase offset $\alpha$ is due to factors such as spatial coherence phenomena and phase-change on reflection. Its value may for example be determined by calculation, by iterative application of Equation 12, by empirical methods such as those described in copending and commonly-owned U.S. patent application Ser. No. 07/937,591, filed Aug. 31, 1992 and entitled "Method And Apparatus For Profiling A Rough Surface Using Phase Shifting Interferometry", the disclosure of which is expressly incorporated by reference herein, or by some combination of these or other known methods.

Figure 5:
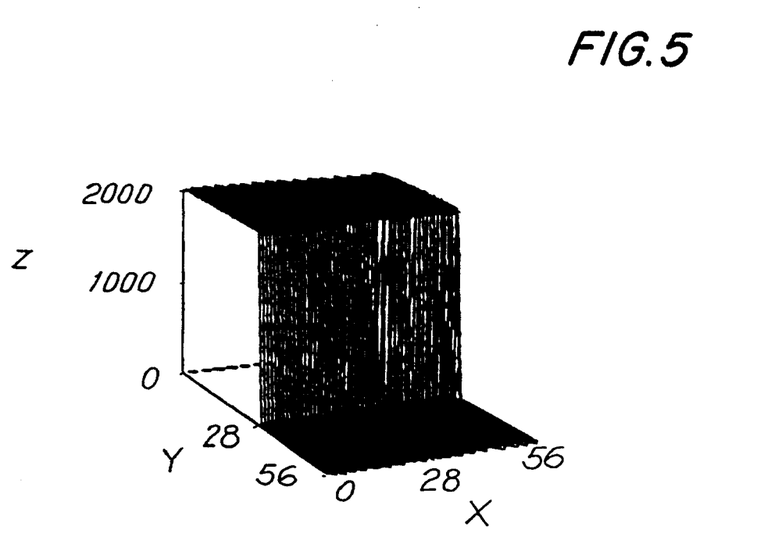
FIG. 5 is an isometric representation of three-dimensional surface measurement.

The final step in the inventive signal processing technique is the construction of a representation of the object surface topography in the preferred form of an isometric, color-coded or cross-sectional graph in accordance with the results $\Delta h(x,y)$, or $\Delta h'(x,y)$, which may then be rendered in printed form or displayed on a computer monitor or the like. This step appears as the block 19 in FIG. 1. An example of such an isometric three-dimensional plot of a 1700-nm surface discontinuity obtained with an instrument constructed in accordance with the teachings of the present invention is shown in FIG. 5. Obvious additional processing steps, such as the calculation of surface figures, statistical parameters such as surface roughness, and the size of discontinuous features such as step heights, channels and relief patterns, are also within the intended scope and contemplation of the invention.

Figure 6:
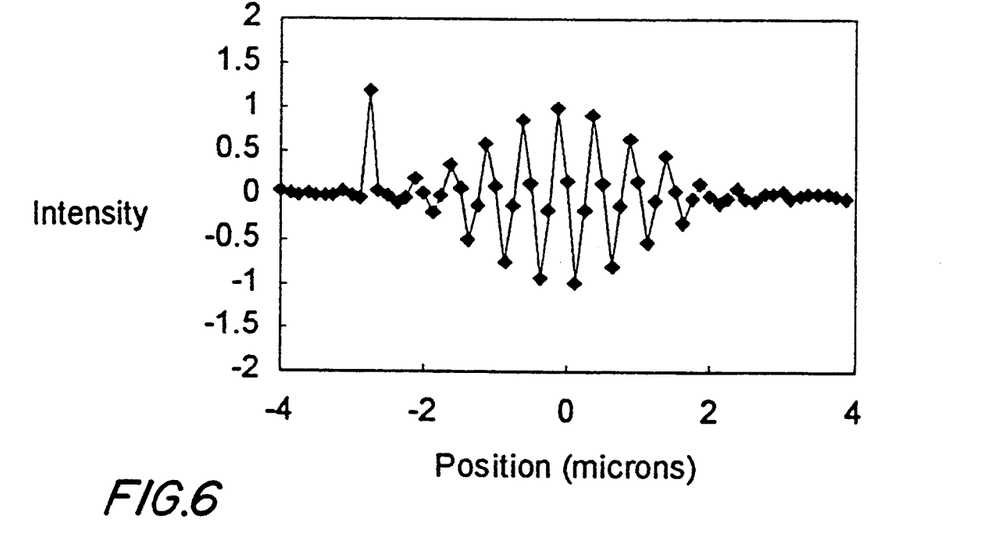
FIG. 6 is a graph depicting an interferogram which includes a noise spike.

As should now be evident, the present invention differs markedly and fundamentally from the prior art in that fringe contrast is never calculated, and no assumptions regarding the overall shape, symmetry or continuity of the fringe contrast envelope enter into the signal processing calculations or methodology. For example, the interferogram depicted in FIG. 6 contains a noise spike which, in prior-art systems, would be erroneously interpreted as the position of maximum range contrast, leading to an error of over 1 $\mu$m in calculated surface height. In the inventive method, the noise spike introduces only a small distortion in the transformed data and results in an error of less than 10 nm.

Further advantages are gained from the ability of the method and apparatus of the present invention to distinguish between the phase-velocity OPD, the group-velocity OPD, and the rate of change of the group-velocity OPD with wavenumber. The distinction between these quantities is essential for three-dimensional profiling of transparent dispersive media such as optical glasses, semiconductor materials, and biological samples.

Still further advantages are gained from the ability to analyze the relative strengths or intensities of the various spatial frequency components of the interferograms, thus making it possible to accurately and dynamically calibrate the instrument for use with various kinds of sources and surfaces. In particular, there is no restriction in the method and apparatus of the present invention to use with sources having smooth, continuous spectral emissions of a specific mean wavelength; indeed, the source may have multiple discrete colors of various spectral widths. The only requirement is that there be sufficient phase data for an unambiguous least-squares fit in the spatial-frequency domain. Moreover, any distortion of the source spectrum due to surface colors or related effects can be easily accommodated by the inventive method.

It should further be pointed out that the present invention may advantageously be applied to the topographical profiling of surfaces of materials of unknown composition including, by way of example, materials of heterogeneous composition whose index of refraction is complex. For this purpose, the invention will utilize or employ a narrow-band or quasi-monochromatic source with a high numerical aperture. The method and apparatus of the invention are capable of providing highly accurate measurements of three-dimensional surface topography substantially independent of any optical phase change introduced by reflection of the illumination source beam from the object surface.

Yet additional advantages of the invention relate to the ability to adjust the data sampling rate which, in the prior art, is generally fixed with respect to an assumed value of the mean wavelength of the source. Instead of being restricted to exactly three or exactly four data samples per interference fringe—as is required to apply the most commonly-known algorithms for calculating fringe contrast—the inventive method can accommodate almost any sampling rate, depending on the desired speed of data acquisition and the quality of the interference signal.

Figure 7:
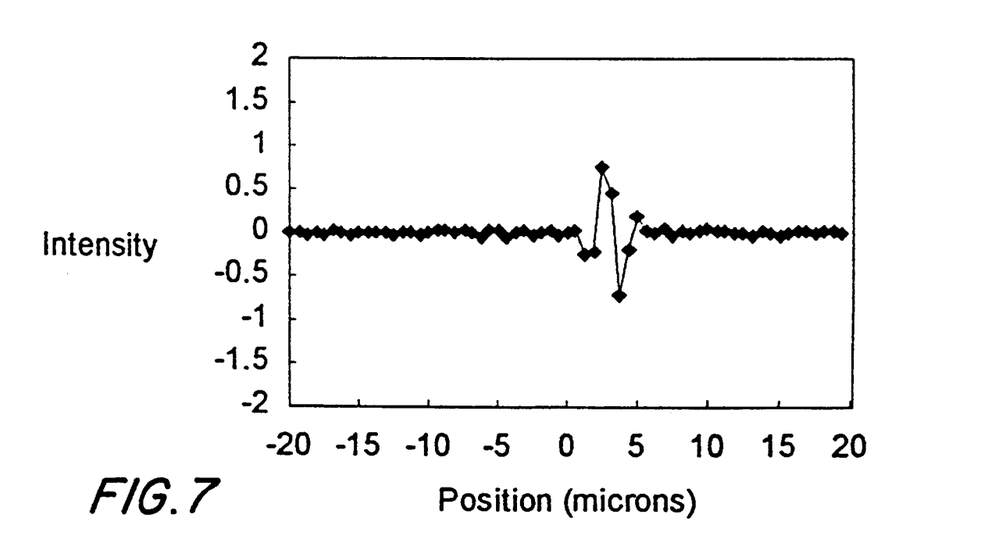
FIG. 7 is a graph depicting an interferogram that has been sampled at a rate two-and-one-half times less than the Nyquist rate.
Figure 8:
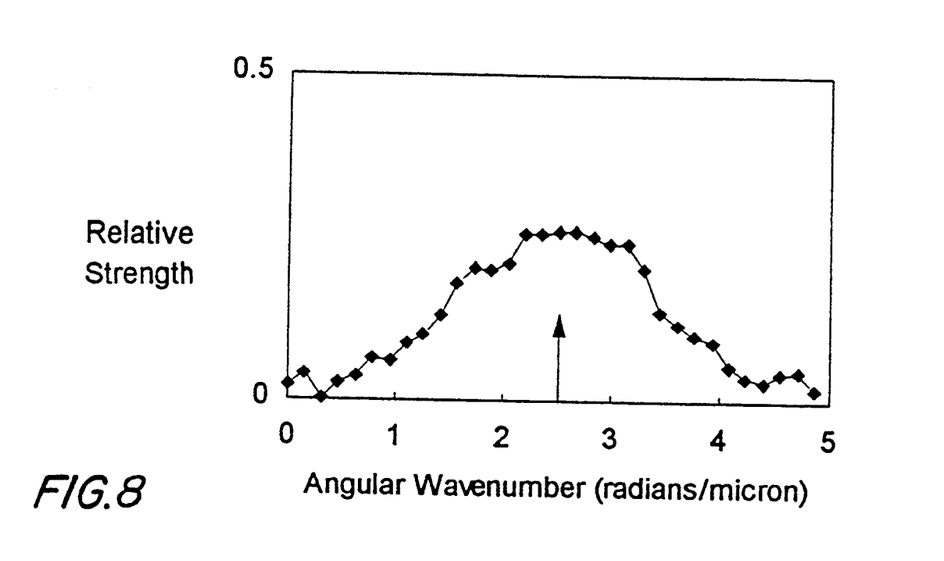
FIG. 8 is a graph depicting the relative strength of the various spatial frequency components of the interferogram shown in FIG. 7.
Figure 9:
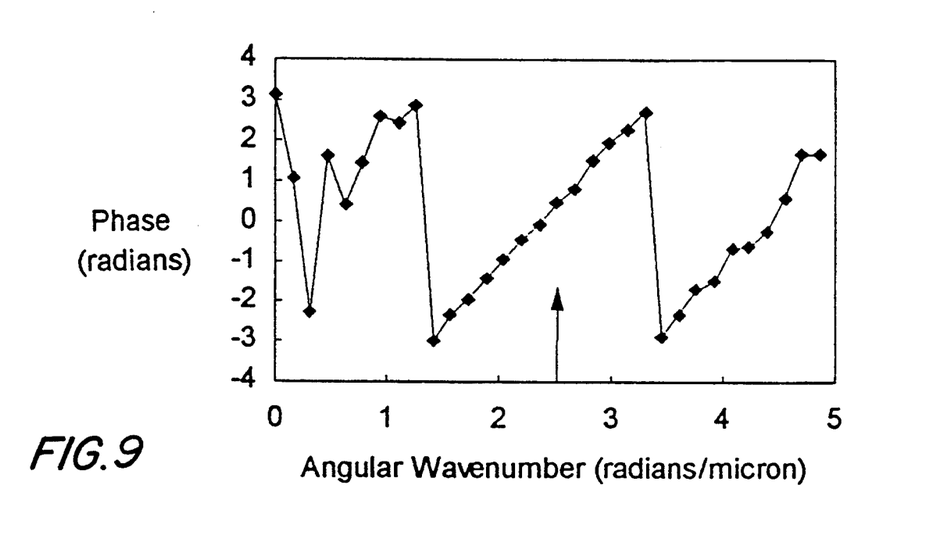
FIG. 9 is a graph depicting the interferometric phases corresponding to the various spatial frequencies shown in FIG. 8.

The signal processing technique and arrangement illustrated in FIG. 1 is capable of accurately measuring surface profiles using an average sampling rate of less than one datum per fringe. FIG. 7 depicts a computer-simulated interferogram obtained under these extreme conditions, with only one datum for every 1¼ fringes. The true interference pattern is the same as that shown in FIG. 2 but, since the fringes have been under-sampled, the interferogram appears severely distorted. Yet despite this distortion, the results obtained by processing this noise-corrupted data in accordance with the teachings of the present invention are still accurate to within a few tens of nanometers; the Fourier-transformed data for this example are shown in FIGS. 8 and 9. It is noteworthy that the under-sampled interferogram requires only 64 points to cover a 40 $\mu$m OPD range. Thus, the present invention can acquire data over large ranges at very high speeds as compared with prior art methods of surface topography measurement by white-light interferometry.

The foregoing disclosure expressly describes various aspects of the invention in the context of a particular type of interferometer and mode of operation. Nevertheless, the fundamental novel features of the invention are readily applied to other instruments based on interference phenomena, including various forms of interference microscopes and the like. Thus, while there have been shown and described and pointed out fundamental novel features of the invention as applied to preferred embodiments thereof, it will be understood that various omissions and substitutions and changes in the form and details of the disclosed methods and apparatus may be made by those skilled in the art without departing from the spirit of the invention. It is the intention, therefore, to be limited only as indicated by the scope of the claims appended hereto.

What is claimed is:

1. A method of topographically profiling a surface of an object, comprising the steps of:
    illuminating the object surface and a reference surface in an interferometer with an illumination source so as produce an interference pattern on a two-dimensional detector optically aligned with the object surface and having a plurality of pixels each corresponding to a respective location on the object surface;
    (b) varying an optical path difference between the reference surface and the object surface so as to produce at each detector pixel an interferogram for a respective object surface location, each said interferogram being defined by a pixel-received variation in interference illumination intensity for the respective object surface location as the optical path difference is varied;
    (c) transforming each said interferogram into the spatial frequency domain to define, for each said pixel, transformed interferogram data, wherein said transformed interferogram data for each said pixel represents relative intensity and interferometric phase of the interferogram received at said each pixel as a function of spatial frequency;
    (d) calculating, for each said pixel, a height of the respective object surface location using said transformed interferogram data by determining interferometric phase of the interferogram as a junction of wavenumber using said transformed interferogram data; and
    (e) creating a topographical profile of the object surface using the heights calculated in said step (d).

2. The method of claim 1, wherein said step (d) further comprises, for each said pixel:
    (i) approximating the interferometric phase as a function of angular wavenumber by a least-squares polynomial fit to said transformed interferogram data; and
    (ii) calculating the height of the respective object surface location from coefficients of the polynomial.

3. The method of claim 2, wherein said step (i) further comprises:
    (1) locating in said transformed interferogram data a region of high relative intensities as a function of angular wavenumber;
    (2) collecting from said region a plurality of data pairs each comprising interferometric phase as a function of angular wavenumber; and
    (3) utilizing said collected data pairs for determining the coefficients in said least-squares polynomial.

4. The method of claim 3, further comprising the step of determining mean wavelength and spectral distribution of an illumination source of the interferometer using said transformed interferogram data.

5. The method of claim 3, wherein said step (e) comprises:
    (A) determining, for pairs of locations on the object surface, a relative height differential $\Delta h$ between the locations in each said pair using the heights calculated in said step (d); and
    (B) providing an improved resolution $\Delta h'$ of said relative height differential determination $\Delta h$ for each said pair by applying each said $\Delta h$ value to the formula:

$$\Delta h' = \frac{1}{2n} \left[ \frac{(\phi_0 - a)}{k_0} - \frac{2\pi}{k_0} Int\left( \frac{(\phi_0 - a) - (2k_0 \cdot \Delta h \cdot n)}{2\pi} \right) \right]$$

wherein n is an index of refraction, $a$ is a constant phase offset, and $\phi_0$ and $k_0$ are an interferometric phase and angular wavenumber, respectively, of a mean emission wavelength spectral peak of an illumination source of the interferometer.

6. The method of claim 1, wherein said step (d) further comprises, for each said pixel:
    (i) approximating the interferometric phase as a function of angular wavenumber by a quadratic polynomial fit to said transformed interferogram data; and
    (ii) calculating the height of the respective object surface location from coefficients of the polynomial.

7. The method of claim 6, wherein said step (i) further comprises:
    (1) locating in said transformed interferogram data a region of high relative intensities as a function of angular wavenumber;
    (2) collecting from said region a plurality of data pairs each comprising interferometric phase as a function of angular wavenumber; and
    (3) utilizing said collected data pairs for determining the coefficients in said polynomial.

8. The method of claim 7, further comprising the step of determining mean wavelength and spectral distribution of an illumination source of the interferometer using said transformed interferogram data.

9. The method of claim 7, wherein said step (e) comprises:
    (A) determining, for pairs of locations on the object surface, a relative height differential $\Delta h$ between the locations in each said pair using the heights calculated in said step (d); and
    (B) providing an improved resolution $\Delta h'$ of said relative height differential determination $\Delta h$ for each said pair by applying each said $\Delta h$ value to the formula:

$$\Delta h' =$$

$$\frac{1}{2n}\left[\frac{(\phi_0 - \alpha)}{k_0} - \frac{2\pi}{k_0} Int\left(\frac{(\phi_0 - \alpha) - (2k_0 \cdot \Delta h \cdot n)}{2\pi}\right)\right]$$

wherein n is an index of refraction, $\alpha$ is a constant phase offset, and $\phi_0$ and $k_0$ are an interferometric phase and angular wavenumber, respectively, of a mean emission wavelength spectral peak of an illumination source of the interferometer.

10. The method of claim 1, wherein said step (d) further comprises:
   (i) determining mean wavelength and spectral distribution of an illumination source of the interferometer using said transformed interferogram data;
   (ii) approximating the interferometric phase as a function of angular wavenumber by a polynomial fit to said transformed interferogram data for each said pixel; and
   (iii) calculating the height of the respective object surface location for each said pixel from coefficients of the polynomial.

11. The method of claim 10, wherein said step (e) comprises:
   (A) determining, for pairs of locations on the object surface, a relative height differential $\Delta h$ between the locations in each said pair using the heights calculated in said step (d); and
   (B) providing an improved resolution $\Delta h'$ of said relative height differential determination $\Delta h$ for each said pair by applying each said $\Delta h$ value to the formula:

$$\Delta h' = \frac{1}{2n}\left[\frac{(\phi_0 - \alpha)}{k_0} - \frac{2\pi}{k_0} Int\left(\frac{(\phi_0 - \alpha) - (2k_0 \cdot \Delta h \cdot n)}{2\pi}\right)\right]$$

wherein n is an index of refraction, $\alpha$ is a constant phase offset, and $\phi_0$ and $k_0$ are an interferometric phase and angular wavenumber, respectively, of a mean emission wavelength spectral peak of an illumination source of the interferometer.

12. The method of claim 11, wherein said polynomial fit comprises a linear least-squares polynomial fit.

13. The method of claim 1, wherein said step (b) further comprises sampling said varying interference illumination intensity received at each said pixel at a rate providing less than two intensity data samples per fringe of the interferogram.

14. The method of claim 1, wherein said illumination source comprises a spectrally-broadband source.

15. The method of claim 1, wherein said illumination source comprises a narrow-band source.

16. A method of determining a height of a location on a three-dimensional object surface, comprising the steps of:
   (a) varying an optical path difference between a reference surface and the object surface in an interferometer so as to produce an interferogram on a detector optically aligned with the object surface location;
   (b) transforming the interferogram received at the detector into the spatial frequency domain to define transformed interferogram data, wherein said transformed interferogram data represents relative intensity and interferometric phase of the interferogram as a function of spatial frequency; and
   (c) calculating the height of the object surface location using said transformed interferogram data by determining the interferometric phase of the interferogram as a function of wavenumber using said transformed interferogram data.

17. The method of claim 16, wherein said interferogram is defined by a varying interference illumination intensity received by the detector as the optical path difference is varied, and wherein said step (a) further comprises sampling said varying interference illumination intensity received at the detector at a rate providing less than two intensity data samples per fringe of the interferogram.

18. The method of claim 16, wherein said step (c) further comprises:
   (i) approximating the interferometric phase as a function of angular wavenumber by a polynomial fit to said transformed interferogram data; and
   (ii) calculating the height of the object surface location from coefficients of the polynomial.

19. The method of claim 18, wherein said step (i) further comprises:
   (1) locating in said transformed interferogram data a region of high relative intensities as a function of angular wavenumber;
   (2) collecting from said region a plurality of data pairs each comprising interferometric phase as a function of angular wavenumber; and
   (3) utilizing said collected data pairs for determining the coefficients in said polynomial.

20. The method of claim 18, wherein said step (i) comprises approximating the interferometric phase as a function of angular wavenumber by a linear least-squares polynomial fit to said transformed interferogram data.

21. The method of claim 16, wherein said step (c) further comprises:
   (i) determining mean wavelength and spectral distribution of an illumination source of the interferometer using said transformed interferogram data;
   (ii) approximating the interferometric phase as a function of angular wavenumber by a polynomial fit to said transformed interferogram data; and
   (iii) calculating the height of the object surface location from coefficients of the polynomial.

22. A method of determining a height of a location on a three-dimensional object surface, comprising the steps of:
   (a) varying an optical path difference between a reference surface and the object surface in an interferometer so as to produce, on a detector optically aligned with the object surface location, an interferogram comprising a plurality of intensity values produced at successive equally spaced apart intervals as the optical path difference is varied;
   (b) transforming the interferogram received at the detector into the spatial frequency domain to define transformed interferogram data comprising, for each of a plurality of angular wavenumbers, a relative intensity and an interferometric phase;
   (c) locating in said transformed interferogram data a region of high relative intensities as a function of angular wavenumber;
   (d) collecting from said located region a plurality of data pairs each comprising an interferometric phase as a function of angular wavenumber;

(e) fitting a polynomial to said data pairs;
(f) determining coefficients of the polynomial; and
(g) calculating the height of the object surface location using said coefficients.

23. The method of claim 22, wherein said polynomial is a linear least-squares polynomial.

24. The method of claim 22, wherein said polynomial is a quadratic polynomial.

25. The method of claim 22, wherein said equally spaced apart intervals are selected so as to provide less than two intensity value samples per fringe of the interferogram.

26. A method of topographically profiling a surface of an object, comprising the steps of:
   (a) illuminating the object surface and a reference surface in an interferometer with an illumination source so as produce an interference pattern on a two-dimensional detector optically aligned with the object surface and having a plurality of pixels each corresponding to a respective location on the object surface;
   (b) varying an optical path difference between the reference surface and the object surface so as to produce at each detector pixel an interferogram for a respective object surface location, each said interferogram being defined by a pixel-received variation in interference illumination intensity for the respective object surface location as the optical path difference is varied;
   (c) transforming each said interferogram into the spatial frequency domain to define, for each said pixel, transformed interferogram data;
   (d) calculating, for each said pixel, a height of the respective object surface location using said transformed interferogram data;
   (e) creating a topographical profile of the object surface using the heights calculated in said step (d); and
   (f) determining mean wavelength and spectral distribution of an illumination source of the interferometer using said transformed interferogram data;
   wherein said transformed interferogram data for each said pixel represents relative intensity and interferometric phase of the interferogram received at said each pixel as a function of spatial frequency, and wherein said step (d) comprises, for each said pixel:
      (i) approximating the interferometric phase as a function of angular wavenumber by a least-squares polynomial fit to said transformed interferogram data; and
      (ii) calculating the height of the respective object surface location from coefficients of the polynomial;
   and wherein said step (i) further comprises:
      (1) locating in said transformed interferogram data a region of high relative intensities as a function of angular wavenumber;
      (2) collecting from said region a plurality of data pairs each comprising interferometric phase as a function of angular wavenumber; and
      (3) utilizing said collected data pairs for determining the coefficients in said least-squares polynomial.

27. A method of topographically profiling a surface of an object, comprising the steps of:
   (a) illuminating the object surface and a reference surface in an interferometer with an illumination source so as produce an interference pattern on a two-dimensional detector optically aligned with the object surface and having a plurality of pixels each corresponding to a respective location on the object surface;
   (b) varying an optical path difference between the reference surface and the object surface so as to produce at each detector pixel an interferogram for a respective object surface location, each said interferogram being defined by a pixel-received variation in interference illumination intensity for the respective object surface location as the optical path difference is varied;
   (c) transforming each said interferogram into the spatial frequency domain to define, for each said pixel, transformed interferogram data;
   (d) calculating, for each said pixel, a height of the respective object surface location using said transformed interferogram data; and
   (e) creating a topographical profile of the object surface using the heights calculated in said step (d);
   wherein said transformed interferogram data for each said pixel represents relative intensity and interferometric phase of the interferogram received at said each pixel as a function of spatial frequency, and wherein said step (d) comprises, for each said pixel:
      (i) approximating the interferometric phase as a function of angular wavenumber by a least-squares polynomial fit to said transformed interferogram data; and
      (ii) calculating the height of the respective object surface location from coefficients of the polynomial;
   wherein said step (i) further comprises:
      (1) locating in said transformed interferogram data a region of high relative intensities as a function of angular wavenumber;
      (2) collecting from said region a plurality of data pairs each comprising interferometric phase as a function of angular wavenumber; and
      (3) utilizing said collected data pairs for determining the coefficients in said least-squares polynomial;
   and wherein said step (e) comprises:
      (A) determining, for pairs of locations on the object surface, a relative height differential $\Delta h$ between the locations in each said pair using the heights calculated in said step (d); and
      (B) providing an improved resolution $\Delta h'$ of said relative height differential determination $\Delta h$ for each said pair by applying each said $\Delta h$ value to the formula:

$$\Delta h' = \frac{1}{2n} \left[ \frac{(\phi_0 - \alpha)}{k_0} - \frac{2\pi}{k_0} Int\left\{ \frac{(\phi_0 - \alpha) - (2k_0 \cdot \Delta h \cdot n)}{2\pi} \right\} \right]$$

wherein n is an index of refraction, $\alpha$ is a constant phase offset, and $\phi_0$ and $k_0$ are an interferometric phase and angular wavenumber, respectively, of a mean emission wavelength spectral peak of an illumination source of the interferometer.

28. A method of topographically profiling a surface of an object, comprising the steps of:
   (a) illuminating the object surface and a reference surface in an interferometer with an illumination source so as produce an interference pattern on a two-dimensional detector optically aligned with the object surface and having a plurality of pixels each corresponding to a respective location on the object surface;

(b) varying an optical path difference between the reference surface and the object surface so as to produce at each detector pixel an interferogram for a respective object surface location, each said interferogram being defined by a pixel-received variation in interference illumination intensity for the respective object surface location as the optical path difference is varied;

(c) transforming each said interferogram into the spatial frequency domain to define, for each said pixel, transformed interferogram data;

(d) calculating, for each said pixel, a height of the respective object surface location using said transformed interferogram data;

(e) creating a topographical profile of the object surface using the heights calculated in said step (d); and (f) determining mean wavelength and spectral distribution of an illumination source of the interferometer using said transformed interferogram data;

wherein said transformed interferogram data for each said pixel represents relative intensity and interferometric phase of the interferogram received at said each pixel as a function of spatial frequency, and wherein said step (d) comprises, for each said pixel:
  (i) approximating the interferometric phase as a function of angular wavenumber by a quadratic polynomial fit to said transformed interferogram data; and
  (ii) calculating the height of the respective object surface location from coefficients of the polynomial;

and wherein said step (i) further comprises:
  (1) locating in said transformed interferogram data a region of high relative intensities as a function of angular wavenumber;
  (2) collecting from said region a plurality of data pairs each comprising interferometric phase as a function of angular wavenumber; and
  (3) utilizing said collected data pairs for determining the coefficients in said polynomial.

29. A method of topographically profiling a surface of an object, comprising the steps of:

(a) illuminating the object surface and a reference surface in an interferometer with an illumination source so as produce an interference pattern on a two-dimensional detector optically aligned with the object surface and having a plurality of pixels each corresponding to a respective location on the object surface;

(b) varying art optical path difference between the reference surface and the object surface so as to produce at each detector pixel an interferogram for a respective object surface location, each said interferogram being defined by a pixel-received variation in interference illumination intensity for the respective object surface location as the optical path difference is varied;

(c) transforming each said interferogram into the spatial frequency domain to define, for each said pixel, transformed interferogram data;

(d) calculating, for each said pixel, a height of the respective object surface location using said transformed interferogram data; and (e) creating a topographical profile of the object surface using the heights calculated in said step (d);

wherein said transformed interferogram data for each said pixel represents relative intensity and interferometric phase of the interferogram received at said each pixel as a function of spatial frequency, and wherein said step (d) comprises, for each said pixel:
  (i) approximating the interferometric phase as a function of angular wavenumber by a quadratic polynomial fit to said transformed interferogram data; and
  (ii) calculating the height of the respective object surface location from coefficients of the polynomial;

wherein said step (i) further comprises:
  (1) locating in said transformed interferogram data a region of high relative intensities as a function of angular wavenumber;
  (2) collecting from said region a plurality of data pairs each comprising interferometric phase as a function of angular wavenumber; and
  (3) utilizing said collected data pairs for determining the coefficients in said polynomial;

and wherein said step (e) comprises:
  (A) determining, for pairs of locations on the object surface, a relative height differential $\Delta h$ between the locations in each said pair using the heights calculated in said step (d); and
  (B) providing an improved resolution $\Delta h'$ of said relative height differential determination $\Delta h$ for each said pair by applying each said $\Delta h$ value to the formula:

$$\Delta h' = \frac{1}{2n}\left[\frac{(\phi_0 - \alpha)}{k_0} - \frac{2\pi}{k_0} Int\left(\frac{(\phi_0 - \alpha) - (2k_0 \cdot \Delta h \cdot n)}{2\pi}\right)\right]$$

wherein n is an index of refraction, $\alpha$ is a constant phase offset, and $\phi_0$ and $k_0$ are an interferometric phase and angular wavenumber, respectively, of a mean emission wavelength spectral peak of an illumination source of the interferometer.

30. A method of topographically profiling a surface of an object, comprising the steps of:

(a) illuminating the object surface and a reference surface in an interferometer with an illumination source so as produce an interference pattern on a two-dimensional detector optically aligned with the object surface and having a plurality of pixels each corresponding to a respective location on the object surface;

(b) varying an optical path difference between the reference surface and the object surface so as to produce at each detector pixel an interferogram for a respective object surface location, each said interferogram being defined by a pixel-received variation in interference illumination intensity for the respective object surface location as the optical path difference is varied;

(c) transforming each said interferogram into the spatial frequency domain to define, for each said pixel, transformed interferogram data;

(d) calculating, for each said pixel, a height of the respective object surface location using said transformed interferogram data; and (e) creating a topographical profile of the object surface using the heights calculated in said step (d);

wherein said transformed interferogram data for each said pixel represents relative intensity and interferometric phase of the interferogram received at said each pixel as a function of spatial frequency, and wherein said step (d) comprises:

(i) determining mean wavelength and spectral distribution of an illumination source of the interferometer using said transformed interferogram data;

(ii) approximating the interferometric phase as a function of angular wavenumber by a polynomial fit to said transformed interferogram data for each said pixel; and (iii) calculating the height of the respective object surface location for each said pixel from coefficients of the polynomial.

31. The method of claim 30, wherein said step (e) comprises:

(A) determining, for pairs of locations on the object surface, a relative height differential $\Delta h$ between the locations in each said pair using the heights calculated in said step (d); and (B) providing an improved resolution $\Delta h'$ of said relative height differential determination $\Delta h$ for each said pair by applying each said $\phi h$ value to the formula:

$$\Delta h' = \frac{1}{2n} \left[ \frac{(\phi_0 - \alpha)}{k_0} - \frac{2\pi}{k_0} Int\left( \frac{(\phi_0 - \alpha) - (2k_0 \cdot \Delta h \cdot n)}{2\pi} \right) \right]$$

wherein n is an index of refraction, $\alpha$ is a constant phase offset, and $\phi_0$ and $k_0$ are an interferometric phase and angular wavenumber, respectively, of a mean emission wavelength spectral peak of an illumination source of the interferometer.

32. The method of claim 31, wherein said polynomial fit comprises a linear least-squares polynomial fit.

33. A method of determining a height of a location on a three-dimensional object surface, comprising the steps of:

(a) varying an optical path difference between a reference surface and the object surface in an interferometer so as to produce an interferogram on a detector optically aligned with the object surface location;

(b) transforming the interferogram received at the detector into the spatial frequency domain to define transformed interferogram data;

(c) calculating the height of the object surface location using said transformed interferogram data;

wherein said transformed interferogram data represents relative intensity and interferometric phase of the interferogram as a function of spatial frequency, and wherein said step (c) comprises:

(i) determining mean wavelength and spectral distribution of an illumination source of the interferometer using said transformed interferogram data;

(ii) approximating the interferometric phase as a function of angular wavenumber by a polynomial fit to said transformed interferogram data; and (iii) calculating the height of the object surface location from coefficients of the polynomial.

* * * * *